(12) United States Patent
Tkaczyk et al.

(10) Patent No.: US 6,199,664 B1
(45) Date of Patent: Mar. 13, 2001

(54) SPRING MOTOR FOR GENERATING CONSTANT TORQUE

(75) Inventors: John Eric Tkaczyk, Delanson; Jerome Johnson Tiemann, Schenectady, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/192,464

(22) Filed: Nov. 16, 1998

(51) Int. Cl.⁷ .................................................... F03G 1/00
(52) U.S. Cl. ................................................ 185/39; 185/37
(58) Field of Search .................... 185/10, 39, 43, 185/37; 290/1 R

(56) References Cited

U.S. PATENT DOCUMENTS

| | | | |
|---|---|---|---|
| 2,063,799 | * 12/1936 | Fornelius et al. | 185/39 |
| 3,194,343 | * 7/1965 | Sindlinger | 185/39 |
| 3,308,907 | 3/1967 | Bodkin . | |
| 3,342,998 | * 9/1967 | Anderson | 185/37 X |
| 4,427,163 | * 1/1984 | Kondziola | 185/37 X |
| 4,719,992 | * 1/1988 | Elward et al. | 185/37 X |
| 9,823,561 | 11/1998 | Toti . | |

FOREIGN PATENT DOCUMENTS

| | | |
|---|---|---|
| 0677638 | 3/1995 | (DE) . |
| 0942337 | 8/1998 | (EP) . |
| 2262324 | 11/1992 | (GB) . |
| 2304208 | 3/1997 | (GB) . |

* cited by examiner

*Primary Examiner*—David A. Bucci
*Assistant Examiner*—Colby Hansen
(74) *Attorney, Agent, or Firm*—Marvin Snyder; Douglas E. Stoner

(57) ABSTRACT

A spring motor for driving an electric power generator with constant power includes a crank-up spool, a take-up spool, and a relatively wide, flat tape spring which winds in a relaxed condition on the take-up spool. In one form, the spring has a width which varies approximately linearly from one end to another end so as to generate a constant torque at a fixed radius from an axis of the crank-up spool as the spring unwinds. In another form, the spring width is constant and a separate drum is driven by contact with the unwinding spring, with the separate drum driving an output shaft. In still another form, an idler wheel is driven by contact with the spring and the output shaft is driven from the idler wheel through gear contact with the periphery of an output drum mounted on the output shaft.

7 Claims, 3 Drawing Sheets

SPRING MOTOR FOR GENERATING CONSTANT TORQUE

BACKGROUND OF THE INVENTION

The present invention relates to spring motors and, more particularly, to a spring motor for delivering constant torque for driving an electric power generator.

There has been a recent interest in development of power systems for electronic devices such as flashlights and radios which can obtain electrical power from mechanical sources. These systems are of particular interest for use in emergency kits in which storage batteries may be depleted or in remote locations where access to electric generators is limited.

U.K. Patent Specification No. 9516144.4 describes a radio which is powered from an electric generator driven by a spring motor. The spring motor comprises a strained steel band which is wound on a torque drum and is then allowed to unwind onto a storage drum. The torque drum is mounted on a shaft which rotates with the drum and is connected to drive an electric power generator. The spring force of the wound spring is released at a constant angular rate so as to drive the generator at a constant speed and produce a constant voltage output. However, although the spring force is constant, the torque developed by the spring motor, which is a product of the spring force and the radius of the spring on the torque drum, varies as the spring unwinds. Since the power developed by the spring motor is proportional to the product of torque and angular frequency, the power output varies as the spring unwinds from the torque drum. When such a variable power source is used to drive a generator, the electric power output of the generator will likewise vary and affect operation of devices receiving the electric power.

Notwithstanding the above described power variation, it is desirable to assure that the power available from the spring motor, even in the last few turns, is sufficient to provide the minimum amount of power necessary to operate electrical devices connected to the electric power generator. Typically, this would be achieved by oversizing the spring motor to produce the desired torque at t he last few turns. Such design, however, will produce excess torque at all other spring conditions and lead to wasted power and extra cost. Accordingly, it is desirable to provide a spring motor which can produce constant torque at any winding state of the spring.

SUMMARY OF THE INVENTION

A spring motor is provided which produces a constant torque and produces a desired torque at any winding state without producing excess torque when fully wound. In at least one embodiment, the invention is described in conjunction with a drive system for an electric power generator in which the drive system includes a spring motor coupled to the generator through a gear train so that each revolution of the spring motor drive shaft produces multiple revolutions of the generator rotor. The spring motor includes a spring in which the spring width varies generally or approximately linearly from one end of the spring to the opposite end, with the narrowest end being at the outer radial position when the spring is fully wound on a torque or crank-up drum or spool. Since the spring force is proportional to the spring width, and the generated torque is proportional to the product of spring force and radius, the resultant motor generates constant torque at all spring winding states.

In still another embodiment, the spring force is transferred to an output shaft which is driven directly from the unwinding spring rather than by the shaft of the crank-up spool. This drive method assures that the spring force is applied at constant radius and results in constant torque. In order to prevent slippage, the spring may be further embodiment uses an idler wheel in contact with the moving spring, with the drive shaft being driven by contact with the periphery of the idler wheel. The idler wheel may include sprocket or gear teeth to prevent slippage on the spring or on contact with the drive shaft. This latter embodiment allows the drive shaft to be fixed in position while the idler wheel accommodates the displacement caused by the change in radius of the spring on the crank-up drum as the spring unwinds.

DETAILED DESCRIPTION OF THE INVENTION

Figure 1:
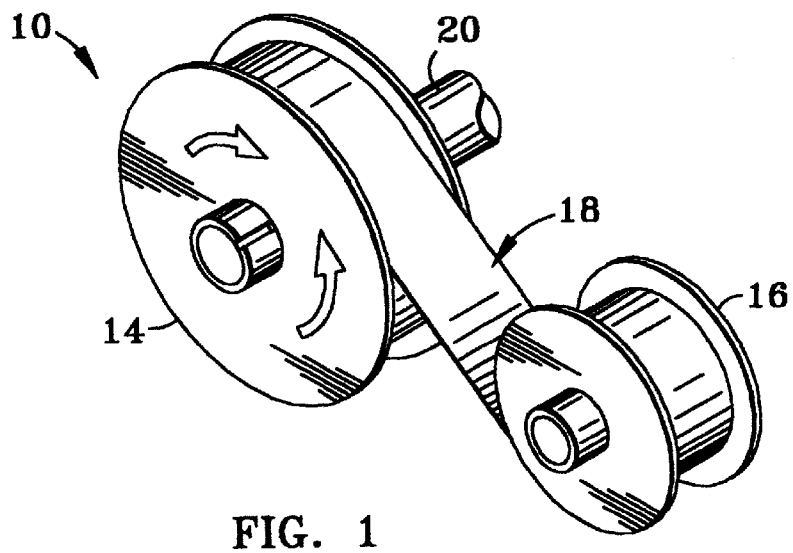
FIG. 1 is a perspective view of a spring motor.
Figure 2:
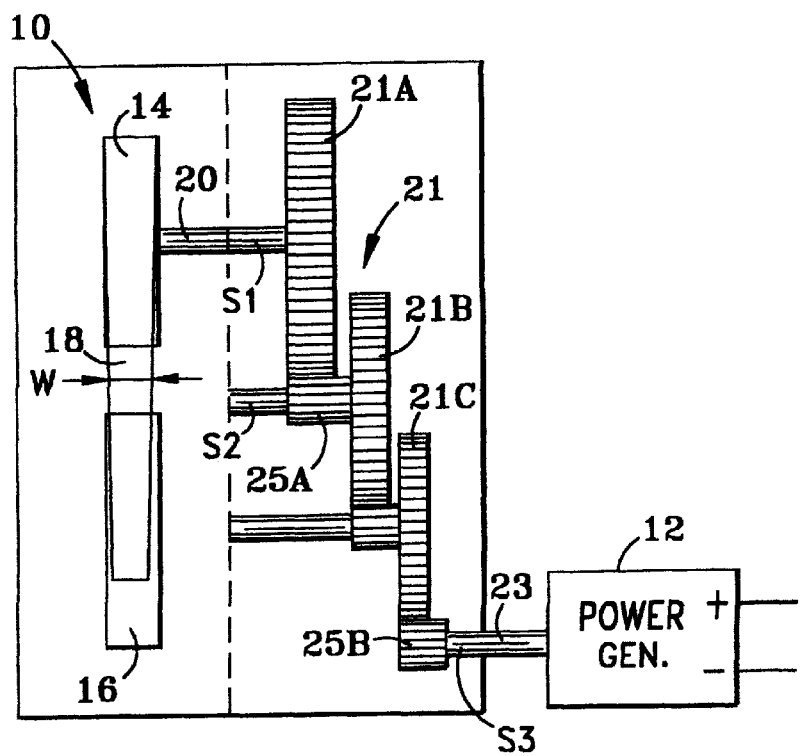
FIG. 2 is a plan view of the spring motor of FIG. 1 showing the decreasing spring width and the coupling of the motor for driving an electric power generator through a gear train.

FIGS. 1 and 2 are simplified representations of a spring motor 10 adapted for driving an electric power generator 12. Motor 10 includes a pair of drums or spools 14 and 16 for holding a flat, tempered spring 18 that constitutes an elongated strip of metal which may be about $\frac{1}{32}$ inch thick by about 4 inches in width W. Spring 18 is constructed in a conventional manner, such as by winding a strip of metal on take-up spool 16 and then heat treating the wound strip to create a spring memory. When spring 18 is then wound in a reverse direction about wind-up or crank-up spool 14, the spring memory causes the spring to upwind from spool 14 and rewind on spool 16. The crank-up spool output shaft 20 is coupled to generator 12 through a gear train 21 designed to translate one revolution of shaft 20 into multiple revolutions of generator rotor shaft 23. For example, the gear ratio of gear train 21 may produce 1000 revolutions of shaft 23 for each revolution of shaft 20. The illustrated gear train 21 uses three separate gears 21A, 21B and 21C to increase the speed of output shaft 23. The first gear 21A is supported on a shaft S1 which is connected to be driven by shaft 20 using a conventional shaft-to-shaft connection. Gear 21B is supported on a shaft S2, which shaft includes a gear 25A driven by gear 21A. Gear 21C is supported on a shaft S3, which shaft includes a gear 25B driven by gear 21B.

The spring tension or spring force of spring 18 is directly proportional to the width W of the spring. However, the torque on output shaft 20 produced by the spring is the product of the spring force and the radius of the spring on crank-up spool 14. In springs of the type used for power generation, the spring radius may vary from 4 inches when fully wound to 2 inches when fully unwound. As a consequence, the torque produced on output shaft 20 of crank-up spool 14 varies as the spring unwinds. This varying torque results in a change in the power delivered to the generator. For example, if the load on the generator is a constant resistance, R, then the power delivered to the load is $I^2R$. For a DC motor used as the generator, the current output is proportional to the torque applied, so it can be seen that the power decreases quadratically as the torque decreases. Thus, it is desirable to provide a spring motor which produces a constant torque.

As noted above, the force produced by the spring 18 is proportional to the width of the spring. Accordingly, in one embodiment of the invention a spring is used which has a width that varies over the length of the spring with the end of the spring connected to take-up spool 16 having the narrower width and the end connected to crank-up spool 14 having the wider width. In this manner, when the spring is wound on the crank-up spool, the outermost layer of spring will have the narrowest width, with each inwardly succeeding layer increasing in width. More specifically, the width W(n) of spring 18 is preferably defined by:

$$W(n)=W_0/(1-Zn/N)$$

where $W_0$ is the width of the spring at the outer radius when the spring is fully wound on crank-up spool 14, n is the number of turns unwound from spool 14, N is the total number of turns and Z represents the fractional decrease in the radius of spool 18 when the spring is fully unwound. As an example, if the radius of the wound spring is 4 inches and the radius of the spool with the spring fully unwound is 3 inches, the value of Z is (4−3)/4 or ¼. A more practical definition of spring width for manufacturing purposes is given by the expression:

$$W(a)=W_0/(1-Za/2N)$$

where "a" is the angle unwound. Alternatively, the width can be expressed as a function of length $$W(L) = \frac{W_0}{\sqrt{1 - \frac{tL}{\pi R_0^2}}}$$

where L is the length measured from the narrow end, t is the thickness of the tape, and $R_0$ is the radius of the wound spool. Even more practical, but much less accurate is the linear relationship:

$$W(L) = W_0\left(1 + \frac{ZL}{(1-Z)L_0}\right)$$

where $L_0$ is the total length of the tape $L_0=2 NR_0 (1-Z/2)$.

Since the spring force is proportional to width, this variation in width translates to a variation in force such that torque becomes a constant. The constant torque produces a generator speed that, in turn, produces a constant voltage.

Figure 3:
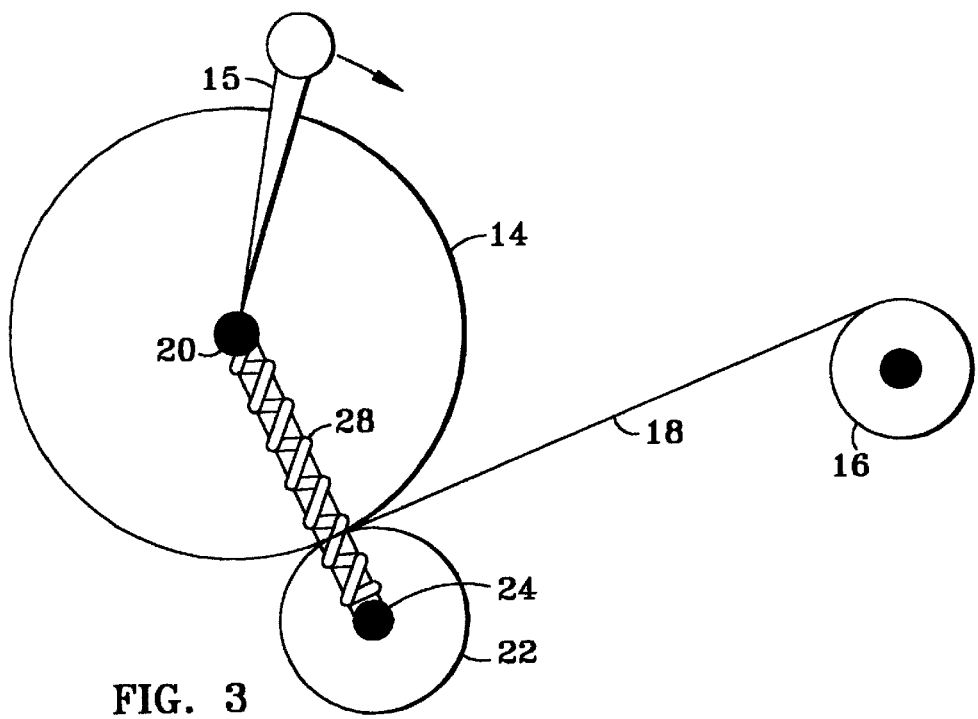
FIG. 3 is a plan view of an embodiment of the spring motor of FIG. 1 using an auxiliary drive drum.

A spring 18 of uniform width can be used to provide a constant output torque by transferring motion of the unwinding spring strip 18 directly to another rotating shaft. As shown in FIG. 3, a drive drum 22 is coupled to drive an output shaft 24 which itself may be coupled to the rotor of generator 12 (FIG. 2). Shaft 24 is spring mounted to shaft 20 of crank-up spool 14, as indicated by a coil spring 28 which pulls shaft 24 toward shaft 20 so as to maintain contact between the outer periphery of drum 22 and spring 18. This transfers the constant force or tension of spring 18 to shaft 24 at a constant distance, i.e., radius of drum 22, so that the torque at shaft 24 is constant. A crank 15, moving in the direction of the arrow, winds spring 18 onto spool 14. A disadvantage of this system is that shaft 24 must translate radially with respect to spool 14 to maintain contact between drum 22 and the decreasing radius of spring 18 on spool 14. Non-axial movement of shaft 24 creates a mechanical interface problem with gear train 21 (FIG. 2). A flexible coupling between shaft 24 and gear train input shaft S1 (FIG. 2) can be used to resolve the coupling problem.

Figure 4:
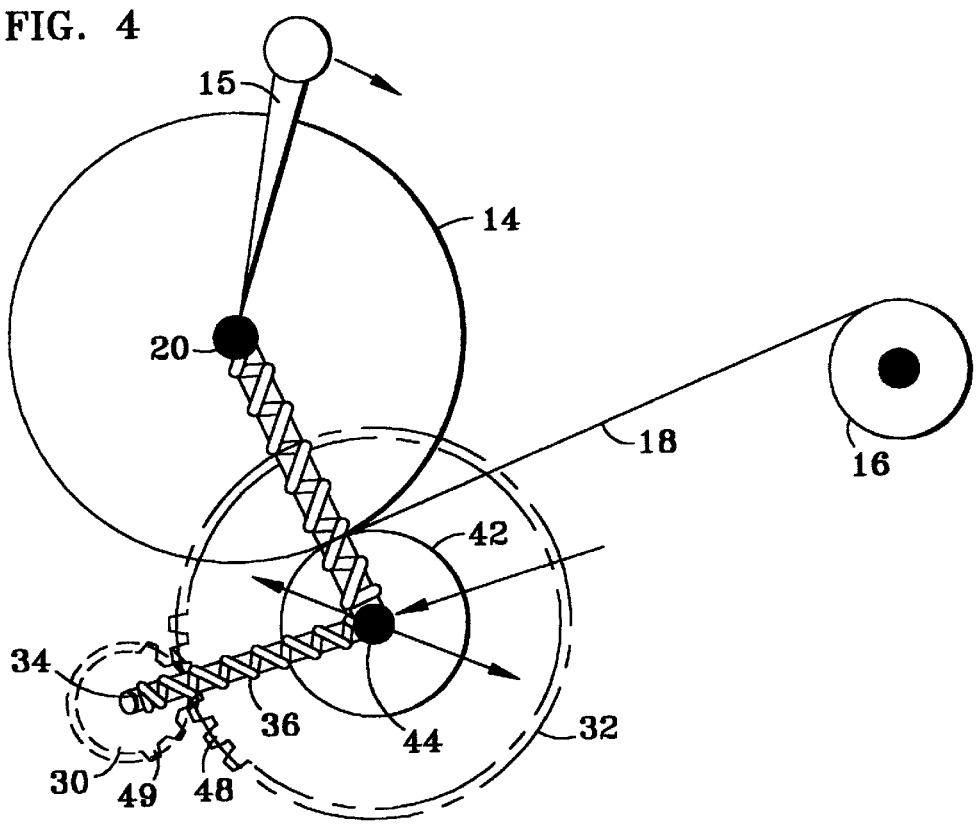
FIG. 4 is a plan view of an embodiment of the spring motor of FIG. 3 showing use of an idler wheel.

FIG. 4 illustrates a further embodiment of the system of FIG. 3, which has the advantage that the output shaft driving gear train 21 (FIG. 2) remains stationary in a translation direction. Here, a drum 42 is used as an intermediate drive drum or idler wheel and transfers its rotation to an output spool or drum 30. A secondary spur gear 32 with teeth 48 is preferably coupled to an idler shaft 44 and rotates in unison with drum 42. The diameter of gear 32 can be larger than drum 42 and drum 30 so as to create an additional step-up in speed of drum 30. In the illustrative form, drum 42 drives shaft 44 on which is mounted spur gear 32. Drum 30, which constitutes a drive gear and may be a simple spur gear, has its outer periphery with gear teeth 49 (indicated partially by phantom lines) in contact with the gear teeth on the periphery of spur gear 32. Drum 30 is mounted on, and drives, an output shaft 34. A coil spring 36 couples shaft 34 to shaft 44 although shaft 44 is allowed to float so as to be movable with respect to both shaft 34 and shaft 20. Output shaft 34 may be coupled to the rotor of generator 12 (FIG. 2) through gear train 21 (FIG. 2) to maintain a desired torque at the generator. This embodiment allows output shaft 34 to be fixed in position and simplifies the coupling between shaft 34 and gear train input shaft S1 (FIG. 2).

Figure 5:
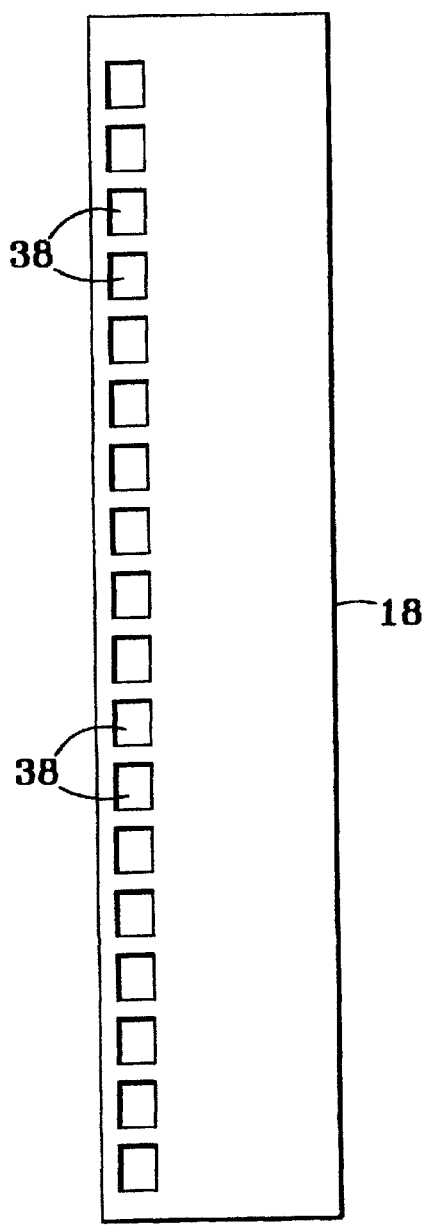
FIG. 5 is a plan view of a spring having notches to inhibit slipping.
Figure 6:
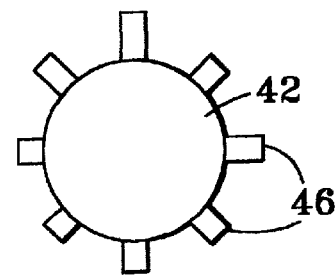
FIG. 6 is a plan view of a gear for driving the spring shown in FIG. 5.

While drum 42 is unlikely to slip on spring 18, it may be desirable to form spring 18 with a plurality of uniformly spaced notches 38, as shown in FIG. 5. In such form, drum 42, as shown in FIG. 6, may comprise a sprocket wheel or gear having teeth 46 which mesh with notches 38.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A spring motor for delivering constant power to a load, the spring motor comprising:

a crank-up spool and a take-up spool;

a flat, tape spring pre-treated to wind normally in a relaxed configuration about said take-up spool;

means for winding said spring in a reverse, tensioned configuration on said crank-up spool with at least one end of said spring being attached to said take-up spool, whereby release of said winding means allows said spring to unwind from said crank-up spool and rewind onto said take-up spool;

an idler shaft coupled in driven relationship to said spring whereby transfer of said spring from said crank-up spool to said take-up spool causes rotation of said idler shaft;

an idler wheel attached to said idler shaft and positioned in frictional engagement with said spring; and a plurality of uniformly spaced notches in said spring, said idler wheel including means for engaging said notches to establish a positive driving relationship between said spring and said shaft.

2. The spring motor of claim 1 wherein the width of the spring is defined by:

$$W(n)=W_0/(1-Zn/N)$$

where $W_0$ is the width of the spring at said at least one end, n is the number of turns unwound from said crank-up spool, N is the total number of turns of said spring on said crank-up spool and Z is the fractional decrease in radius of the spring on the crank-up spool when fully unwound.

3. The spring motor of claim 2 and including an electric power generator coupled to be driven by rotation of said crank-up spool.

4. The spring motor of claim 1 wherein said means for engaging said notches comprises a plurality of teeth uniformly circumscribing said idler wheel.

5. The spring motor of claim 4 and including:

an output shaft;

an output spool mounted on said output shaft; and means drivably coupling said idler shaft to said output spool.

6. The spring motor of claim 1 wherein said spring is formed with a width which varies generally linearly from a narrow width at said at least one end to a wider width at the opposite end thereof such that torque generated by said spring remains constant with change in radial displacement of said spring on said crank-up spool.

7. The spring motor of claim 6 and including;

an electric power generator having a rotor shaft; and a gear train for coupling said output shaft to said rotor shaft for establishing a desired torque at the rotor shaft.

* * * * *